United States Patent [19]

Lee

[11] Patent Number: 5,218,694

[45] Date of Patent: Jun. 8, 1993

[54] DUAL SELECTION SYSTEM FOR REFERENCE FREQUENCY FOR USE IN A CLOCK

[75] Inventor: Byung H. Lee, Kyungki, Rep. of Korea

[73] Assignee: Goldstar Co., Ltd., Seoul, Rep. of Korea

[21] Appl. No.: 737,228

[22] Filed: Jul. 29, 1991

[30] Foreign Application Priority Data

Jul. 31, 1990 [KR] Rep. of Korea ............... 11726/1990

[51] Int. Cl.$^5$ .............................................. G06F 1/06
[52] U.S. Cl. ............................... 395/550; 364/705.07; 368/159; 368/200
[58] Field of Search ............... 368/200, 159; 395/550; 364/DIG. 1, DIG. 2, 705.07

[56] References Cited

U.S. PATENT DOCUMENTS 4,342,092  7/1982  Kumagi ............................ 364/569

Primary Examiner—Robert L. Richardson
Attorney, Agent, or Firm—Rosen, Dainow & Jacobs

[57] ABSTRACT

A dual selection system for a reference frequency for use in a clock comprising a microcomputer for controlling the whole system and outputting a switching signal and frequency-demultiplying signals. A system oscillator produces an oscillation signal of 4.194304 MHz. A system frequency-demultiplier for frequency-dividing an output of a first buffer to apply a system clock signal to the microcomputer. A clock oscillator produces an oscillation signal of 32.768 KHz, and a clock frequency-demultiplier for frequency-dividing an output of a second buffer applies a clock signal of 1 Hz for clock to the microcomputer.

When an option is selected, a system oscillation signal of 4.194304 MHz is selected and frequency-demultiplied by $2^{22}$ to a clock signal of 1 Hz for a clock. When that the option is not selected, the clock oscillation signal of 32.768 KHz is frequency-divided by $2^{15}$ to a clock signal of 1 Hz for the clock.

4 Claims, 4 Drawing Sheets

DUAL SELECTION SYSTEM FOR REFERENCE FREQUENCY FOR USE IN A CLOCK

BACKGROUND OF THE INVENTION

The present invention relates to a dual selection system for a reference frequency for use in a clock, and more particularly to a reference frequency dual selection system for a clock which can use an oscillation signal of a clock oscillation circuit as a reference signal during a long-term back-up and can use an oscillation signal of a system oscillation circuit as a reference signal during a short-term back-up.

Generally, in audio and video appliances which utilize a microcomputer, a time-indicating function is provided. To carry out the time-indicating function in such appliances, a reference frequency of 32.768 KHz for driving a clock has been required.

Accordingly, a clock oscillation circuit has been required to produce a reference frequency for driving the clock and a system oscillation circuit has been required for the microcomputer and the like.

Thus, since such systems have the disadvantage in that they require an additional oscillation circuit for use in the clock, the whole circuit configuration of the system is complicated and also it uses an expensive component such as a crystal, thereby increasing the cost of product.

SUMMARY OF THE INVENTION

It is, therefore, an object of the present invention to provide a dual selection system for reference frequency for use in a clock which can select an oscillation signal of a clock oscillation circuit or an oscillation signal of a system oscillation circuit depending upon the selection of an option and then frequency-demultiply the selected signal into a frequency for driving a clock so as to execute a clock-indicating function.

The above object of the present invention is accomplished by providing a dual selection system comprising a microcomputer for executing various controls in response to a selection of function switches of a switch section and outputting a switching signal and frequency-dividing selection signals in response to the connection condition of an option diode of the switch section. A system oscillator produces an oscillation signal of 4.194304 MHz for a system. A first buffer buffers and amplifiers the oscillation signal of the system oscillator. A system frequency-demultiplier for frequency-divides the output signal of the buffer and applies it to the microcomputer as a system clock signal. A clock oscillator produces an oscillation signal of 32.768 KHz for a clock. A selection switch selects the oscillation signal of the system oscillator or the oscillation signal of said clock oscillator upon the control of the switching signal of the microcomputer. A second buffer buffers and amplifies the oscillation signal which has been selected by said selection switch. A clock frequency-demultiplier for frequency-dividing the output signal of the second buffer by $2^{22}$ or by $2^{15}$ upon the control of frequency-demultiplying selection signals of said microcomputer and applying the frequency-demultiplied signal to the microcomputer as a clock signal of 1 Hz for a clock.

BRIEF DESCRIPTION OF THE DRAWINGS

The above and other objects, features and advantages of the present invention will be apparent from the following detailed description taken in conjunction with the accompanying drawings, wherein.

DETAILED DESCRIPTION OF THE INVENTION

Figure 1:
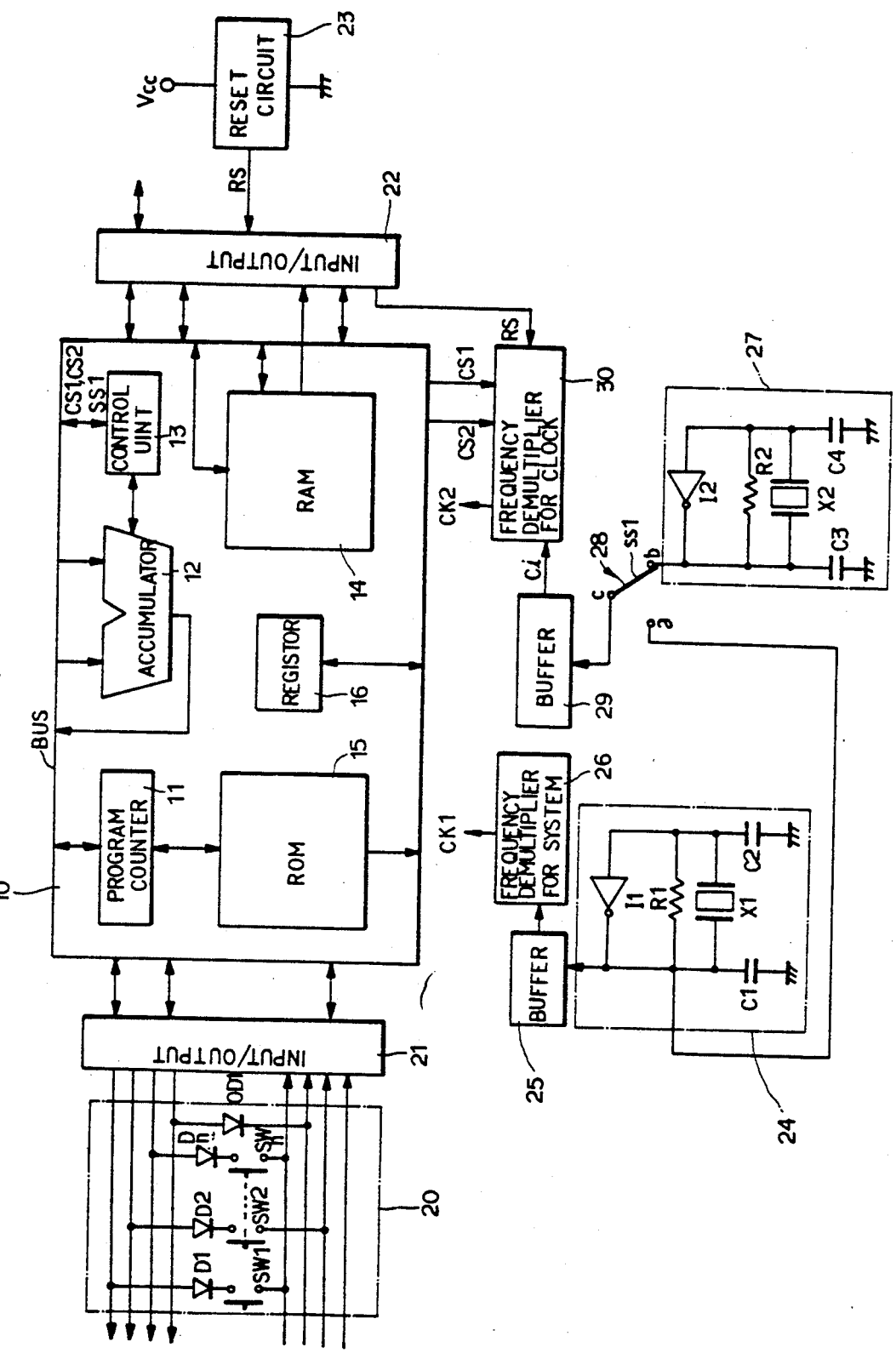
FIG. 1 is a block diagram of the dual selection system according to the present invention.

Referring to FIG. 1, the dual selection system of the present invention comprises a switch section 20 including various function switches $SW_1$-$SW_n$ and an option diode $OD_1$, and a microcomputer 10 for checking the condition of the switch section 20 through a first input-/output 21 to execute relevant controls and initializing the system by receiving a reset signal RS from a reset circuit through a second input/output 22. A system oscillator 24 is comprised of a quartz-crystal oscillator $X_1$, a resistor $R_1$, compacitors $C_1$ and $C_2$, and an inverter $I_1$ for producing a system oscillation signal of 4.194304 MHz. A buffer 25 buffers and amplifies the oscillation signal of the system oscillator 24. A system frequency-demultiplier 26 frequency-demultiplies (i.e. frequency divides) the output signal of the buffer 25 into a system clock signal $CK_1$ to be used in the microcomputer 10. A clock oscillator 27 is comprised of a quartz-crystal oscillator $X_2$, a resistor $R_2$, capacitors $C_3$ and $C_4$ and an inverter $I_2$ for producing a clock oscillation signal of 32.768 KHz. A selection switch 28 selects an oscillation signal of the system oscillator 24 or an oscillation signal of the clock oscillator 27 upon the control of the switching signal $SS_1$ of the microcomputer 10. A buffer 29 buffers and amplifies the oscillation signal which has been selected by the selection switch 28. A clock frequency-demultiplier 30 is connected to be reset by a reset signal RS output from the reset circuit 23 which passes through the input/output 22, and frequency-divides by $2^{22}$ or by $2^{15}$ the output signal of the buffer 29 into a clock signal $CK_2$ of 1 Hz for a clock upon the control of the frequency-demultiplying selection signals $CS_1$ and $CS_2$ of the microcomputer 10. In the drawings, reference numeral 11 denotes a program counter, 12 an accumulator, 13 a control unit, 14 a RAM, 15 a ROM, and 16 a register, respectively.

Figure 2:
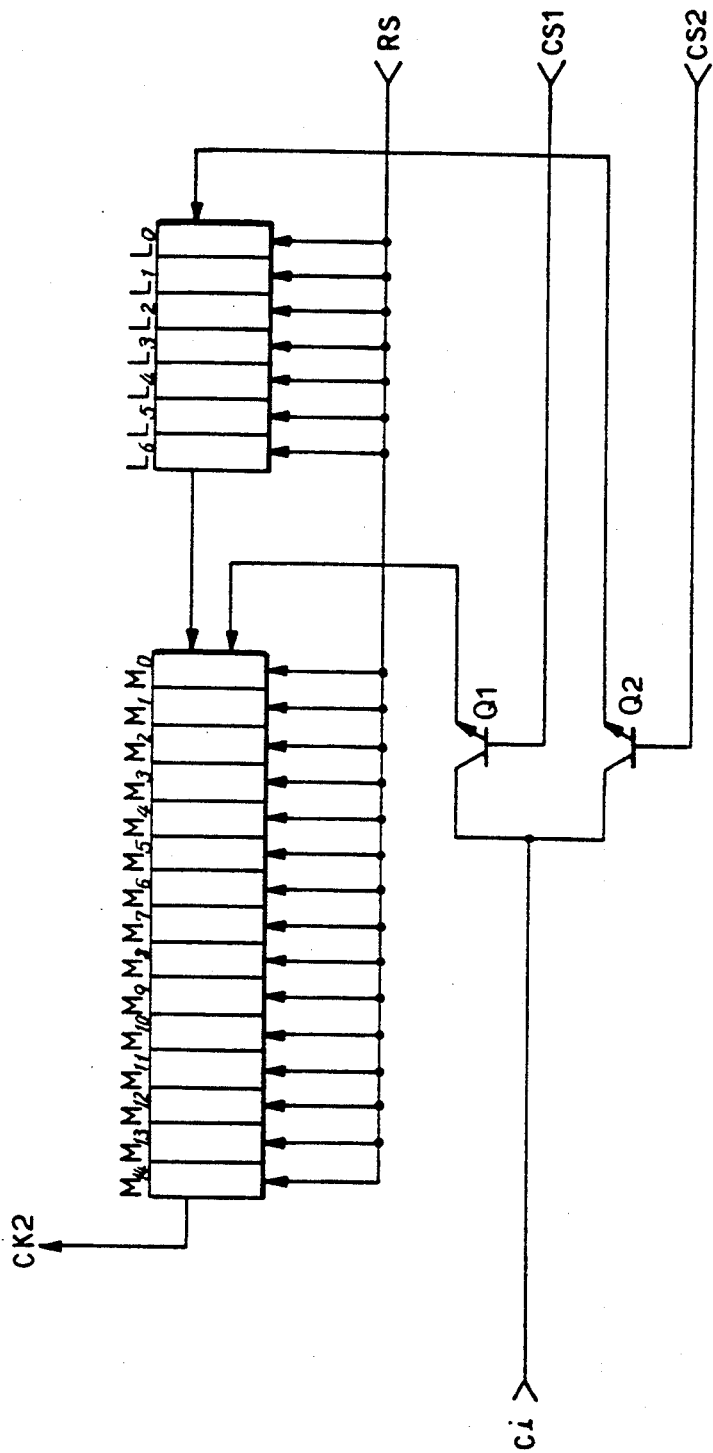
FIG. 2 is a detailed circuit diagram of a clock frequency-demultiplier of FIG. 1.

Referring to FIG. 2, which is a detailed circuit diagram of the clock frequency-demultiplier 30, the frequency-demultiplier comprises frequency halving counter cells $L_0$-$L_6$ and $M_0$-$M_{14}$ which are connected in series and reset by the reset signal RS inputted through the input/output 22. A transistor $Q_1$ applies an output signal Ci from the buffer 29 to an input terminal of the frequency halving counter cell $M_0$ upon the control of the frequency-demultiplying selection signal $CS_1$ of the microcomputer 10. A transistor $Q_2$ applies the output signal Ci of the buffer 29 to an input terminal of the frequency halving counter cell $L_0$ upon the control of the frequency-demultiplying selection signal $CS_2$ of the microcomputer 10. In the above, the frequency halving counter cells $L_0$-$L_6$ and $M_0$-$M_{14}$ are flip-flops.

Hereinafter, the; operation of the present invention will be described with reference to the flow-chart of FIG. 3.

When the power is supplied from the source Vcc, a reset signal RS is initially outputted from the reset circuit 23, and the reset signal RS is applied to the microcomputer 10 through the input/output 22 so that the microcomputer 10 is initialized. The reset signal RS is also applied to the frequency halving counter cells $L_0-L_6$ and $M_0-M_{14}$ of the clock frequency-demultiplier 30, thereby causing the frequency halving counter cells $L_0-L_6$ and $M_0-M_{14}$ to be reset.

At this time, a system oscillation signal of 4.194304 MHz is produced by the system oscillator 24 and buffer-amplified by the buffer 25, thereafter frequency-divides into a system clock signal $CK_1$ by the system frequency-demultiplier 26 and then applied to the microcomputer 10. As a result, the microcomputer 10 executes normal control operation synchronized with the system clock signal $CK_1$. That is, the microcomputer 10 outputs a key scan signal to the switch section 20 through the output terminals $P_0-P_3$ of the input/output 21 so that key signals depending upon the selection of various function switches $Sw_1-SW_n$ and the option diode $OD_1$ of the switch section 20 are inputted to the microcomputer 10 through the input/output 21, so that the control unit 13 of the microcomputer 10 executes control operations responsive to the key signals through the input/output 22.

On the other hand, when the option diode $OD_1$ is connected and a relevant signal is inputted to the microcomputer 10, a high potential switching signal $SS_1$ is outputted by the control unit 13 of the microcomputer 10, so that the common terminal c of the selection switch 28 is short-circuited to its side terminal a. And, at this time, the microcomputer 10 outputs a low potential frequency-demultiplying selection signal $CS_1$ and a high potential frequency-demultiplying selection signal $CS_2$, thereby causing the transistor $Q_1$ of the clock frequency-demultiplier 30 to be cut off and the transistor $Q_2$ to become conductive.

Accordingly, the oscillation signal of 4.194304 MHz outputted by the system oscillator 24 is buffered and amplified at the buffer 29 through the selection switch 28 and then inputted to the clock frequency-demultiplier 30. As a result, the oscillation signal Ci inputted to the clock frequency-demultiplier 30 at that moment is an oscillation signal of 4.194304 MHz, and this oscillation signal passes through the transistor $Q_2$ and is then applied to the frequency halving counter cell $L_0$ so as to be frequency halved in turn by the frequency halving counter cells $L_0-L_6$ and $M_0-M_{14}$. Thus, the oscillation signal of 4.194304 MHz is frequency-divided by $2^{22}$ (=4,194,304) at the twenty two frequency halving counter cells $L_0-L_6$ and is $M_0-M_{14}$ and then applied to the microcomputer 10 as a clock signal $CK_2$ of 1 Hz for a clock.

On the other hand, when the option diode $OD_1$ is not connected and a relevant signal is not applied to the microcomputer 10, a low potential switching signal $SS_1$ is outputted at the control unit 13 of the microcomputer 10 so that the common terminal c of the selection switch 28 is short-circuited to other side terminal b1, and at this time a high potential frequency-demultiplying selection signal $CS_1$ and a low potential frequency-demultiplying selection signal $CS_2$ are outputted by the control unit 13 of the microcomputer 10 so that the transistor $Q_1$ of the clock frequency-demultiplier 30 is conductive and the transistor $Q_2$ is cut off.

Accordingly, at this time the oscillation signal of 32.768 KHz outputted from the clock oscillator 27 is buffer-amplified by the buffer 29 after having passed through the selection switch 28 and is then inputted to the clock frequency-demultiplier 30. As a result, the oscillation signal Ci inputted to the clock frequency-demultiplier 30 is an oscillation signal of 32.768 KHz and this oscillation signal Ci is inputted to the frequency halving counter cell $M_0$ through the transistor $Q_1$ so as to be frequency halved in turn at the frequency dividing counter cells $M_0-M_{14}$. Thus, the oscillation signal of 32.768 KHz is frequency-demultiplied by $2^{15}$ (=32,768) at fifteen frequency halving counter cells $M_0-M_{14}$ and then applied to the microcomputer 10 as a clock signal $CK_2$ of 1 Hz for a clock.

Figure 3A:
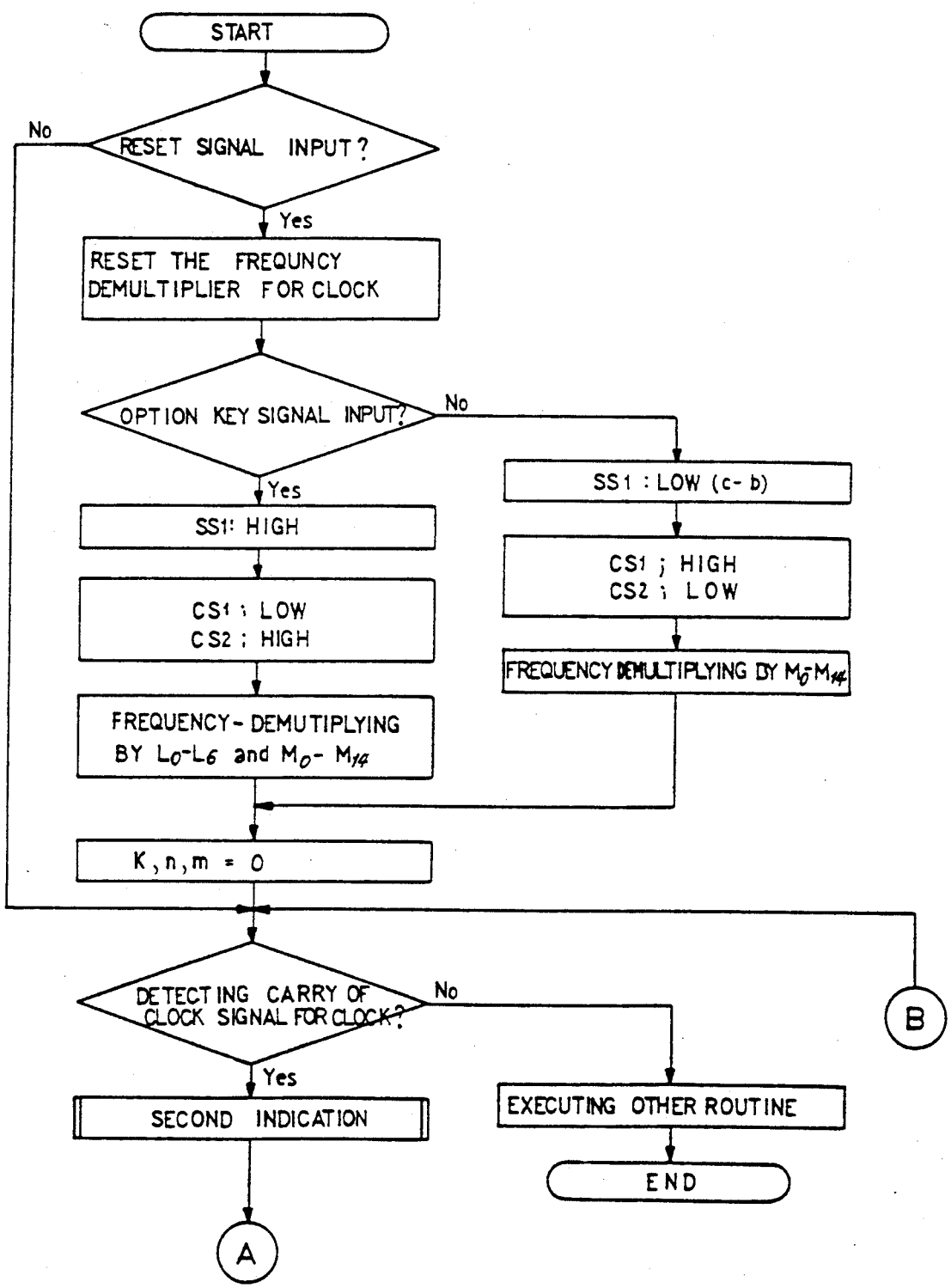
FIGS. 3(a) and 3(b) are flowcharts showing the control procedure of the system of the present invention.
Figure 3B:
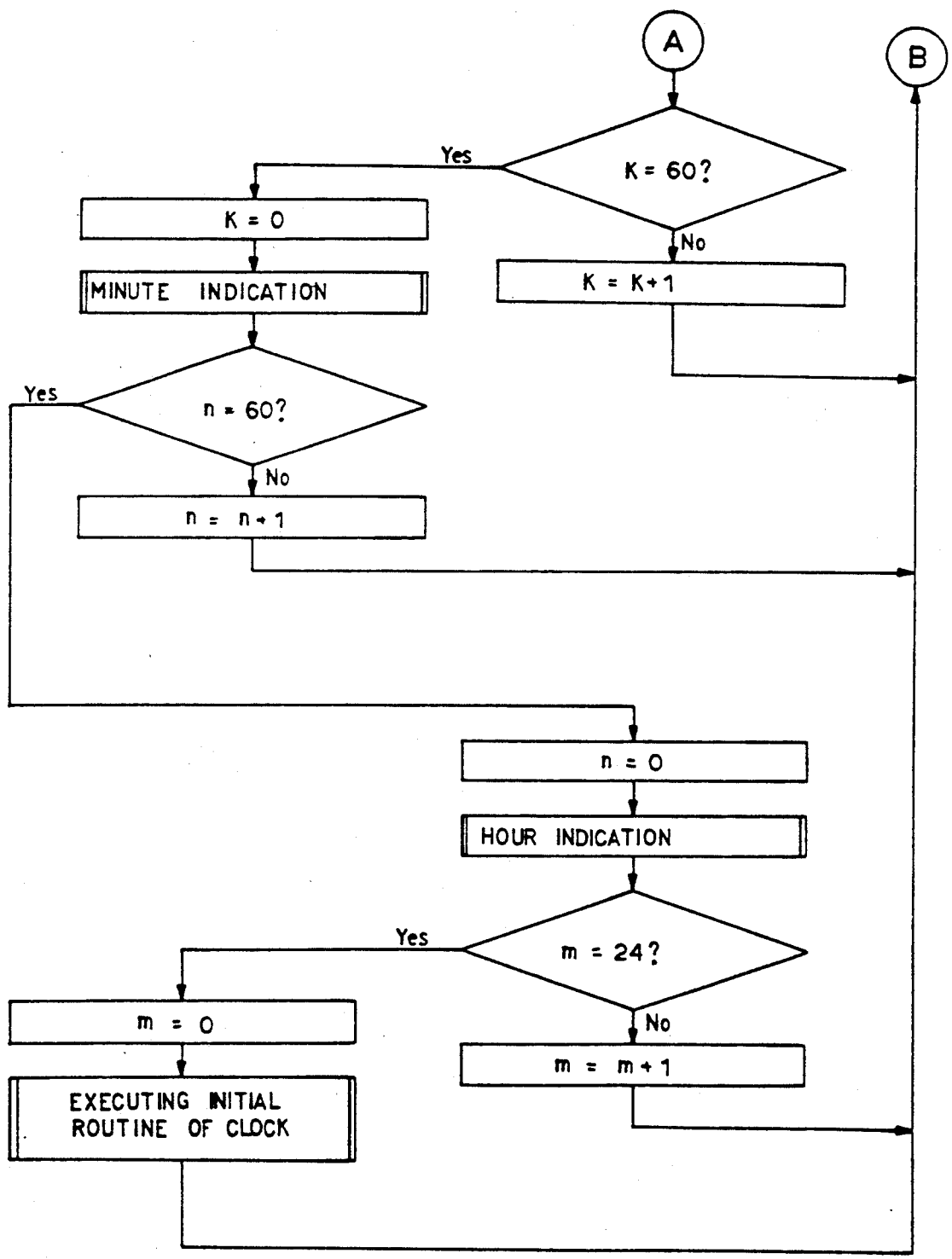

When the clock signal $CK_2$ of 1 Hz for a clock is applied to the microcomputer 10, the clock indicating function is carried out by using the clock signal $CK_2$ for a clock as shown in the flow-chart of FIG. 3.

That is, a second-counter constant K, a minute-counter constant n, and an hour-counter constant m are cleared to "0", thereafter when a carry of the clock signal $CK_2$ for a clock is not detected, other functions based on various function switches $SW_1-SW_n$ of the switch unit 20, for example, a routine of the functional modes such as playback, stop, fast forward, rewind and the like is executed and then returned to the start position by the internal interrupt signal of the microcomputer 10.

When a carry of the clock signal $CK_2$ is detected, the indication of current second depending upon the second-counter constant K is carried out, thereafter when the second-counter constant K is below "60", a step for discriminating whether a carry of the clock signal $CK_2$ is detected, and next ones are carried out repeatedly, while increasing the second-counter constant K by "1".

On the other hand, when the second-counter constant K is "60", the second-counter constant K is cleared to "0" and the indication of current minute depending upon the minute-counter constant n is carried out, thereafter when the minute-counter constant n is below "60", a step for discriminating whether a carry of the clock signal $CK_2$ for clock is detected, and the next ones are carried out repeatedly, while increasing the minute-counter constant n by "1".

When the minute-counter constant n is "60", the minute-counter constant n is cleared to "0" and the indication of hour depending upon the hour-counter constant m is carried out, thereafter when the hour-counter constant m is below "24", the step for discriminating whether a carry of the clock signal $CK_2$ for clock is detected, and the next ones are carried out repeatedly, while increasing the hour-counter constant m by "1". On the other hand, when the hour-counter constant m is 24, the hour-counter constant m is cleared to "0" and an initial routine of the clock for a date-up is carried out and then a step for discriminating whether a carry of the clock signal $CK_2$ for the clock is detected, and next ones are carried out repeatedly.

As described above in detail, the present invention provides the effects of simplifying the construction of the circuit of the whole system by eliminating an oscillation circuit for a clock since it uses a system oscillation signal and a clock oscillation signal as a reference frequency for driving a clock, and selects the system oscillation signal by an option and frequency-demultiplies the system oscillation signal to output a clock signal of 1 Hz for the clock. The further effect is provided that since the frequency of the system oscillation signal is 4.194304 MHz and that of the clock oscillation signal is 32.768 KHz, the indication of the clock is as precise as the ratio of the frequency difference between said signals when using the system oscillation signal.

Although, preferred embodiments of the invention have been disclosed for illustrative purpose, those skilled in the art will appreciate that various modifications, additions and substitutions are possible, without departing from the scope and spirit of the invention as disclosed in the accompanying drawings.

What is claimed is:

1. A selection system for selecting a reference frequency for use in a clock comprising:
   a microcomputer, a plurality of function switches connected to output switching signals to control said microcomputer to output control selection signals and including means for producing frequency dividing selection signals in response to a connection condition thereof
   a system oscillator for producing an oscillation signal of 4.194304 MHz for said microcomputer;
   a first buffer connected to buffer and amplify the oscillation signal of the system oscillator;
   a system frequency divider for frequency-dividing the output signal of the first buffer and applying it to the microcomputer as a system clock signal;
   a clock oscillator for producing an oscillation signal of 32.768 KHz for a clock;
   a selection switch connected to select either the oscillation signal of said clock oscillator in response to the application of said selection signals to the microcomputer;
   a second buffer connected to buffer and amplify the oscillation signal which has been selected by said selection switch; and
   a clock frequency divider for selectively dividing the frequency of the output signal of the second buffer by $2^{22}$ or by $2^{15}$ in response to control selection signals of said microcomputer and means for applying the frequency divided signal to the microcomputer as a clock signal of 1 Hz for a clock.

2. The system as claimed in claim 1, wherein said frequency divider comprises frequency halving counter means which are connected in series and reset by a reset signal outputted from a reset circuit, a first transistor connected to apply the output signal of the second buffer to an input terminal of one of the frequency halving counter means upon the control of the control selection signal of the microcomputer, and a second transistor connected to apply the output signal of the second buffer to an input terminal of one of the frequency halving counter means upon the control of the control selection signal of the microcomputer.

3. A selection system for selecting a reference frequency for use in a clock, comprising:
   a microcomputer;
   first and second oscillators having different oscillation frequencies and means connecting said first oscillator to said microcomputer to provide system oscillations thereto;
   function switch means connected to control said microcomputer, said function switch means including means for producing a frequency dividing selection signal, said microcomputer being responsive to said frequency dividing selection signal to output a control selection signal;
   frequency dividing means;
   a clock output terminal; and
   means responsive to said control selection signals and connected to said frequency dividing means for selectively dividing the outputs of said first and second oscillators by first and second different numbers for applying the resultant frequency divided oscillations to said clock output terminal, said different numbers being selected to produce output oscillations of the same output frequency for application to said clock output terminal.

4. The selection system of claim 3 wherein said means responsive to said control selection signals comprises a selection switch.